(12) United States Patent
Ewert et al.

(10) Patent No.: US 11,493,211 B2
(45) Date of Patent: Nov. 8, 2022

(54) FUEL CELL HEATER SYSTEM

(71) Applicant: Anderson Industries, LLC, Webster, SD (US)

(72) Inventors: Daniel Ewert, Lake Park, MN (US); Joel Jorgenson, Fargo, ND (US)

(73) Assignee: Anderson Industries, LLC, Webster, SD (US)

( * ) Notice: Subject to any disclaimer, the term of this patent is extended or adjusted under 35 U.S.C. 154(b) by 538 days.

(21) Appl. No.: 16/179,585

(22) Filed: Nov. 2, 2018

(65) Prior Publication Data

US 2019/0137116 A1     May 9, 2019

Related U.S. Application Data

(60) Provisional application No. 62/582,139, filed on Nov. 6, 2017.

(51) Int. Cl.
*F24D 19/10*     (2006.01)
*H01M 8/0612*     (2016.01)
(Continued)

(52) U.S. Cl.
CPC ........... *F24D 19/1084* (2013.01); *F24D 5/02* (2013.01); *F24D 12/02* (2013.01); *F24D 19/1096* (2013.01); *H01M 8/04067* (2013.01); *H01M 8/04843* (2013.01); *H01M 8/04895* (2013.01); *H01M 8/0618* (2013.01);
(Continued)

(58) Field of Classification Search
CPC .... F24D 19/1084; F24D 5/02; F24D 19/1096; F24D 2220/042; F24D 2220/07; F24D 2220/19; F24D 12/02; F24D 2220/08; H01M 8/04067; H01M 8/04843; H01M 8/04895; H01M 8/0618; H01M 2250/405
See application file for complete search history.

(56) References Cited

U.S. PATENT DOCUMENTS 5,432,710 A * 7/1995 Ishimaru ........... H01M 8/04992
                                                                705/412
5,985,474 A * 11/1999 Chen ................... H01M 8/0612
                                                                429/410
(Continued)

FOREIGN PATENT DOCUMENTS

DE     19951215 A1 *  4/2000   ........... F24H 1/0027
DE     19951215 A1     4/2000
(Continued)

OTHER PUBLICATIONS

Jeong, KR 10-2013-0022312 A English machine translation, Mar. 6, 2013 (Year: 2013).*

(Continued)

*Primary Examiner* — Steven S Anderson, II
*Assistant Examiner* — Phillip Decker
(74) *Attorney, Agent, or Firm* — Womble Bond Dickinson (US) LLP

(57) ABSTRACT

A heater is described. The heater includes a fuel cell to produce heated air, electricity and water vapor. The heater further includes a heating element operatively coupled to the fuel cell to convert the electricity to heat and a control system operatively coupled to the fuel cell and the heating element, the control system being configured to monitor and control the fuel cell and heating element.

18 Claims, 5 Drawing Sheets

(51) Int. Cl.
  *H01M 8/04858* (2016.01)
  *H01M 8/04828* (2016.01)
  *H01M 8/04007* (2016.01)
  *F24D 12/02* (2006.01)
  *F24D 5/02* (2006.01)

(52) U.S. Cl.
  CPC ...... *F24D 2200/08* (2013.01); *F24D 2200/19* (2013.01); *F24D 2220/042* (2013.01); *H01M 2250/405* (2013.01)

(56) References Cited

U.S. PATENT DOCUMENTS

| | | | | |
|---|---|---|---|---|
| 6,387,556 | B1 * | 5/2002 | Fuglevand | H01M 8/04302 429/429 |
| 7,763,368 | B2 * | 7/2010 | Kaye | H01M 8/04604 429/424 |
| 8,373,099 | B2 * | 2/2013 | Lifson | H01M 8/04007 219/476 |
| 2007/0072030 | A1 * | 3/2007 | Heo | H01M 8/04052 429/423 |
| 2010/0183934 | A1 * | 7/2010 | Yukimasa | H01M 8/04052 429/437 |
| 2011/0020715 | A1 * | 1/2011 | Shinoda | H01M 8/04955 429/410 |

FOREIGN PATENT DOCUMENTS

| | | | |
|---|---|---|---|
| EP | 1327835 A2 * | 7/2003 | ........... F24H 3/0488 |
| EP | 1327835 A2 | 7/2003 | |
| EP | 1770806 A1 | 4/2007 | |
| EP | 2065961 A1 | 6/2009 | |
| KR | 20130022312 A * | 3/2013 | |
| WO | 2003076857 A2 | 9/2003 | |
| WO | 2005064728 A1 | 7/2005 | |
| WO | 2010074767 A1 | 7/2010 | |

OTHER PUBLICATIONS

Transmittal of International Preliminary Report on Patentability for PCT/US2018/059252, filed Nov. 5, 2018, dated May 22, 2020, 6 pages.

International Search Report and Written Opinion dated Feb. 7, 2019 for International application No. PCT/US2018/059252.

Extended European Search Report on the Patentability of Application No. 18874916.2 dated Jul. 6, 2021, 9 pages.

* cited by examiner

FUEL CELL HEATER SYSTEM

CROSS REFERENCE TO RELATED APPLICATIONS

This application claims the benefit of U.S. Provisional Patent Application No. 62/582,139, filed on Nov. 6, 2017, which is hereby incorporated by reference in its entirety.

TECHNICAL FIELD

Aspects and implementations of the present disclosure relate to fuel cell heater systems.

BACKGROUND

Fuel cells are electrochemical cells that convert energy from a fuel into electricity. The fuel cell converts energy from the fuel through an electrochemical reaction of the fuel with oxygen or another oxidizing agent. The fuel cell can include an anode, an electrolyte and a cathode. At the anode a catalyst oxidizes the fuel, turning the fuel into positively charged ions and negatively charged electrons. The positively charged ions pass through the electrolyte, while the negatively charged electrons cannot pass through the electrolyte. The negatively charged electrons travel through a wire to create electric current. The negatively charged electrons are then reunited with the positively charged ions at the cathode.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
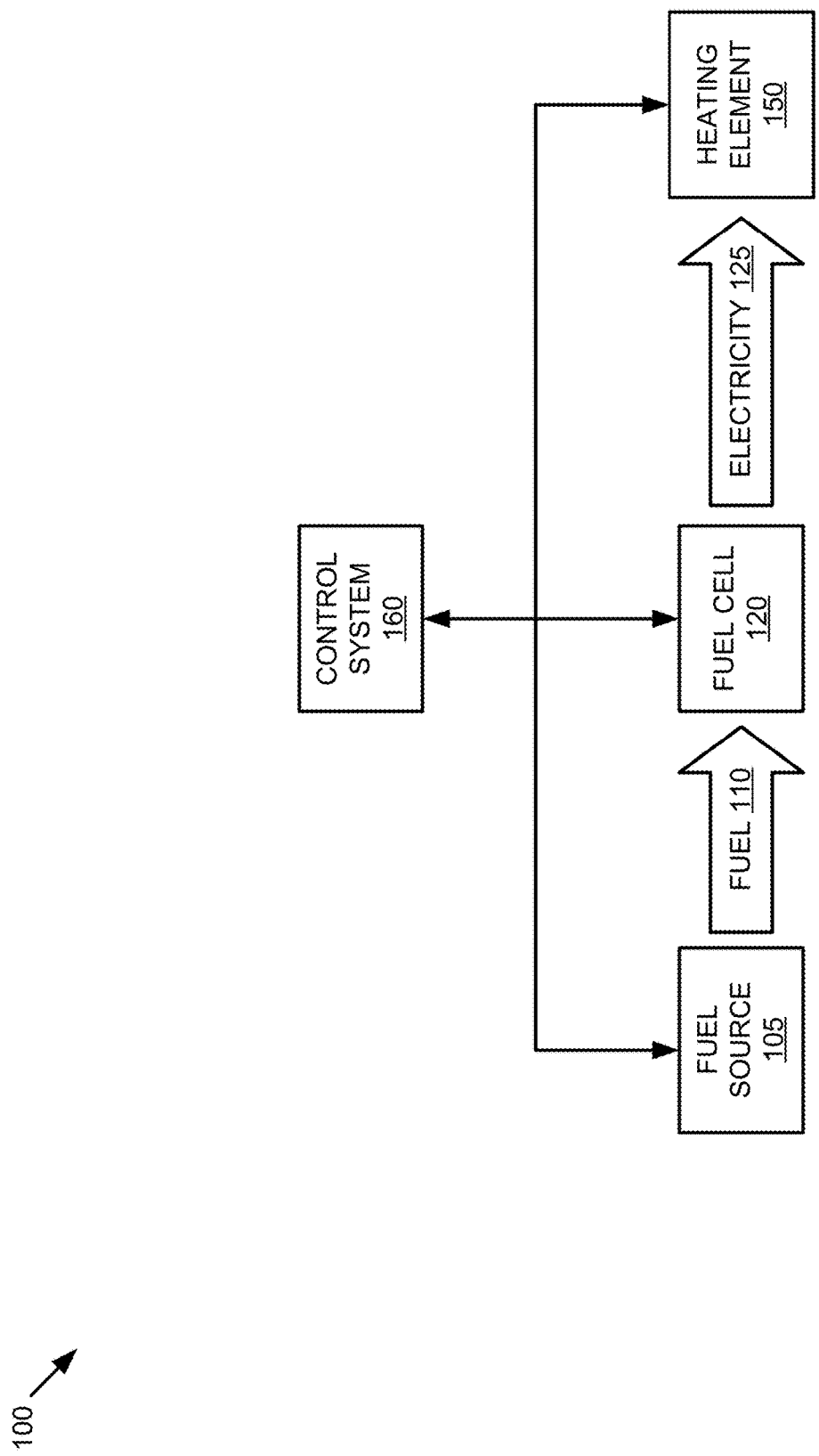
FIG. 1 illustrates a configuration of a fuel cell heater in accordance with embodiments of the present disclosure.

Aspects and implementations of the present disclosure are directed to a fuel cell heater. Fuel cells are electrochemical cells that convert energy from a fuel into electricity. The electricity generated by a fuel cell may be used in a heater system. In some embodiments, the fuel cell heater system may be a flameless heater system that includes a heating element that converts the electricity generated by the fuel cell into heat.

Flameless heaters are used to provide heat in harsh and potentially hazardous environments, such as oil fields or grain drying. Flameless heaters operate in environments that include volatile gasses that may be ignited by an ignition source, such as a spark or an open flame. The use of flameless heaters in such environments reduce the risk of explosions or uncontrolled fires by providing heat without the use of an ignition source.

One example of a conventional flameless heater system utilizes a turbine engine. The turbine engine is used to generate high volumes of heated air without an ignition source. However, turbine engines generate unsafe levels of noise. Furthermore, if the intake air for the turbine engine is contaminated with dust or debris, the turbine engine may shut down. Additionally, the complexity and cost of maintenance of a turbine engine is high compared to other heat sources.

Another example of a conventional flameless heater system utilizes an internal combustion engine to drive a fluid based heat generator. The heat generator shears a fluid, causing the fluid to heat. The heated fluid is then circulated through hoses using an engine-driven pump to a storage tank. The heated fluid is then transferred from the storage tank to a fluid-to-air heat exchanger, where the heat is extracted from the heated fluid. However, the lifespan of many of the components, such as the heat generator, pumps, hoses, seals, etc., of the heater system are relatively short. Furthermore, the cost of the fluids used in the shearing process is relatively high and harmful to the environment in the event of a leak or spill. Additionally, such a conventional system has difficulties operating in warm ambient conditions as the shearing fluid may overheat and cause system faults or shutdowns.

A third example of a conventional flameless heater system utilizes an internal combustion engine to drive a fan while moving magnets to create heat. Typically, the conventional flameless heater system utilizes a diesel engine to drive the fan. However, diesel engines have wear items, such as belts, alternators and batteries, which often need to be replaced. Furthermore, the conventional flameless heater system is unable to operate for extended periods of time since the engine requires shutdown for oil changes and lubrication. Additionally, to operate within emission standards, a diesel engine may require expensive air, oil and particulate filters, increasing the cost of operation.

Embodiments of the present disclosure address the issues of noise, reliability, complexity and environmental issues of the conventional designs by eliminating the engine. By replacing either the turbine engine or the internal combustion engine with a fuel cell, the issues experienced by conventional flameless heater systems are eliminated. The resulting flameless heater system may operate more safely, quietly and reliably in any environmental condition when compared to conventional flameless heater systems. A further advantage of the fuel cell heater is the variety of the fuel that may be used in the flameless heater. For example, while prior designs were highly limited to the type and quality of fuel consumed (turbine engines require jet fuel, diesel engines require purified diesel fuel), a flameless heater using certain types of fuel cells may utilize many available fuel sources, such as diesel, gasoline, jet fuel, natural gas, methanol and propane. Another advantage of the fuel cell heater is the byproduct of the reaction within a fuel cell is water, reducing the environmental impact of operating the fuel cell heater.

FIG. 1 illustrates a configuration of a fuel cell heater 100 in accordance with embodiments of the present disclosure. The fuel cell heater 100 may include a fuel source 105, a fuel cell 120, a heating element 150 and a control system 160.

The control system 160 may be operatively coupled to the fuel source 105, the fuel cell 120 and the heating element 150. The control system 160 may also be operatively coupled to one or more sensors (not shown) that gather data on various parameters of fuel cell heater 100. The control system 160 includes a processing device configured to monitor the various parameters of fuel cell heater 100 and control various operations of fuel cell heater 100. For example, the control system 160 may monitor the heat output of heating element 150, the fuel level of fuel source 105, the power output of fuel cell 120, etc.

The fuel cell 120 converts energy from a fuel into electricity. The fuel cell converts energy from the fuel through an electrochemical reaction of the fuel with oxygen or another oxidizing agent. The fuel cell can include an anode, an electrolyte and a cathode. At the anode a catalyst oxidizes the fuel, turning the fuel into positively charged ions and negatively charged electrons. The positively charged ions pass through the electrolyte, while the negatively charged electrons cannot pass through the electrolyte. The negatively charged electrons travel through a wire to create electric current. The negatively charged electrons are then reunited with the positively charged ions at the cathode, where the negatively charged electrons react with the positively charges ions to produce water vapor and heat. Various types of fuel cells may be used in various embodiments of the present disclosure depending on a type of fuel of the fuel source. Examples of types of fuel cells that may be used include, but are not limited to, proton exchange membrane fuel cells (PEMFCs), phosphoric acid fuel cells (PAFCs), solid acid fuel cells (SAFCs), alkaline fuel cells (AFC), solid oxide fuel cells (SOFCs), molten carbonate fuel cells (MCFCs) and electric storage fuel cells.

The fuel source 105 is a storage system for the fuel 110 that is to be provided to fuel cell 120. Examples of fuel sources may include, but are not limited to, storage tanks, containers, bladders, reservoirs and the like. As previously described, various types of fuel 110 may be used in fuel cell heater 100 depending on the type of fuel cell 120 used in fuel cell heater 100. Examples of fuel 110 that may be used by fuel cell heater 100 include, but are not limited to, hydrogen, carbon monoxide, methanol, methane, gasoline, diesel, jet fuel and other hydrocarbon fuels. The fuel source 105 is operatively coupled to fuel cell 120 to provide fuel 110 from fuel source 105 to fuel cell 120. For example, one or more hoses or tubes may be coupled between the fuel source 105 and the fuel cell 120 to provide the fuel 110 to fuel cell 120. In embodiments, one or more pumps may be utilized to move the fuel 110 from the fuel source 105 to the fuel cell 120.

Upon receipt of the fuel 110, the fuel cell 120 converts the fuel 110 into electricity 125, as previously described. The electricity 125 generated by the fuel cell 120 may be provided to a heating element 150 that is operatively coupled to the fuel cell 120. For example, the heating element 150 may be coupled to the fuel cell 120 via one or more wires to provide electricity 125 to the heating element 150. The heating element 150 may be configured to convert the electricity 125 received from fuel cell 120 into thermal energy (e.g., heat).

In embodiments, the heating element 150 may be a radiant heater that emits infrared radiation. In an embodiment, the heating element 150 may be a convection heater that utilizes a heating element to heat the air in contact with the heating element by thermal conduction. In some embodiments, the heating element 150 may be a heat pump that utilizes an electrically driven compressor to operate a refrigeration cycle that extracts heat energy from outdoor air, the ground or ground water, and moves the heat into the space to be warmed. In embodiments, the heating element 150 may be an electrical resistance heating element. In an embodiment, the heating element 150 may be any device that converts electricity 125 generated by fuel cell 120 into thermal energy.

Figure 2:
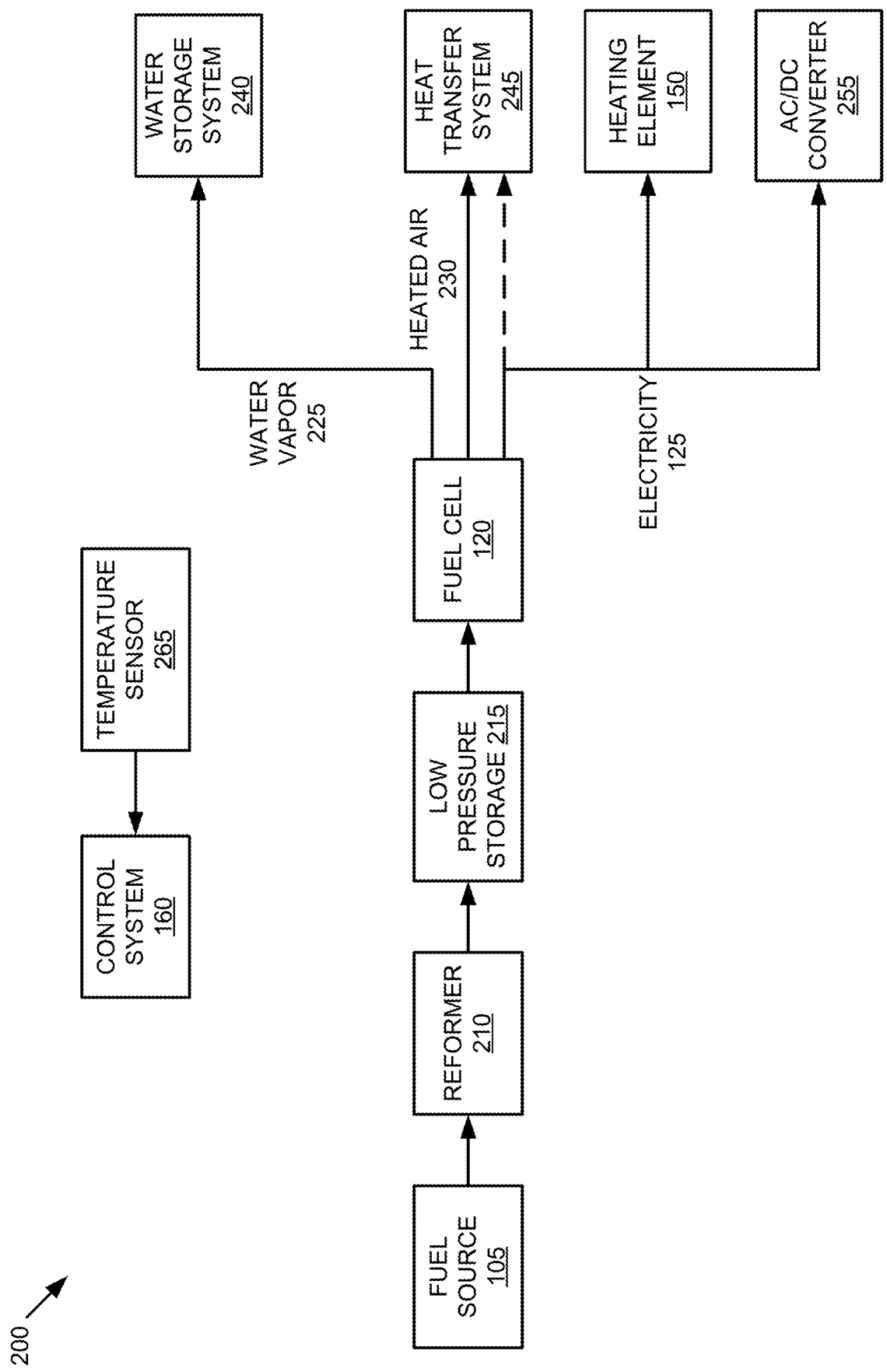
FIG. 2 illustrates a configuration of a fuel cell heater system in accordance with one embodiment of the present disclosure.

FIG. 2 illustrates a configuration of a fuel cell heater system 200 in accordance with one embodiment of the present disclosure. The fuel cell heater system 200 includes fuel source 105, fuel cell 120, heating element 150 and control system 160, as previously described at FIG. 1. For illustrative purposes, fuel cell heater system 200 will be described with fuel source 105 storing methanol as the fuel type. However, embodiments of the disclosure may use any fuel types.

A reformer 210 may be operatively coupled to fuel source 105. The reformer 210 may be configured to extract hydrogen from the methanol fuel provided by fuel source 105. An example reformer 210 may be a steam reformer that is configured to cause a reaction between steam at a high temperature and pressure with a hydrocarbon fuel source, such as methanol, in the presence of a nickel catalyst. In embodiments, other types of reformers 210 may be used to extract hydrogen from a hydrocarbon fuel source.

Upon extraction of the hydrogen from the methanol fuel by the reformer 210, the extracted hydrogen may be provided to a low pressure storage 215 that is operatively coupled to the reformer 210. Low pressure storage 215 may be a storage system, such as a storage tank or container, which is configured to store the extracted hydrogen at low pressures of approximately one atmosphere. The low pressure storage 215 may provide additional advantages to the fuel cell heater system 200 since storing the extracted hydrogen at a low pressure greatly reduces the risk of explosion and, in the event that the low pressure storage 215 is ruptured, the hydrogen will be released at a much slower rate than a pressurized hydrogen storage system. In some embodiments, rather than storing the extracted hydrogen at the low pressure storage 215, the extracted hydrogen may be provided directly from reformer 210 to fuel cell 120.

The low pressure storage system 215 may be operatively coupled to the fuel cell 120 to provide the extracted hydrogen stored at the low pressure storage system 215 to the fuel cell 120. The fuel cell 120 may generate electricity 125 using the extracted hydrogen, as previously described. Other byproducts of the reaction within the fuel cell 120 may include water vapor 225 and thermal energy (e.g., heated air 230). Embodiments of the disclosure may capture and utilize these byproducts, providing further advantages over a conventional heater system.

In embodiments, a water storage system 240 may be operatively coupled to fuel cell 120. Water vapor 225 that is the result of the reaction that takes place in the fuel cell 120 to generate electricity 125 may be provided from the fuel cell 120 to the water storage system 240. The water storage system 240 may be a liquid storage system, such as a storage tank, bladder, container, reservoir or the like, for storing the water vapor 225. The water vapor 225 may be stored by the water storage system 240 and subsequently utilized for various purposes.

In some embodiments, the heated air 230 generated by the reaction that takes place in the fuel cell 120 to generate electricity 125 may also be used as a heat source to supplement the heat generated by heating element 150. The heated air 230 may be provided to a heat transfer system 245 operatively coupled to the fuel cell 120. The heat transfer system 245 may be configured to move the heated air 230 from the fuel cell 120 to a desired location. In an embodiment, the heat transfer system 245 may include one or more fans that are configured to move the heated air 230. In embodiments, the heat transfer system 245 may include one or more pumps that are configured to move the heated air 230. In some embodiments, the heat transfer system 245 may include a radiator that is configured to transfer the thermal energy of the heated air produced by the fuel cell to a desired location. In embodiments, electricity 125 generated by the fuel cell 120 may be provided to the heat transfer system 245 to power various components of the heat transfer system 245. For example, the electricity 125 may be used to power the fans, pumps, etc. of the heat transfer system 245. In some embodiments, the heated air 230 moved by the heat transfer system may be combined with the heat generated by heating element 150.

The electricity 125 generated by fuel cell 120 may be provided to a heating element 150 that is operatively coupled to the fuel cell 120, as previously described. In embodiments, an alternating current to direct current (AC/DC) converter 255 may be operatively coupled to the fuel cell 120. When a fuel cell 120 generates electricity 125, the electricity 125 is direct current. The AC/DC converter 255 may receive the electricity 125 and convert the electricity from direct current to alternating current. Once converted to alternating current, the electricity 125 may be used to power various ancillary devices.

Fuel cell heater system 200 may include one or more temperature sensors 265. In embodiments, the temperature sensor 265 may be configured to measure a temperature of a volume of space being heated by the fuel cell heater system 200. The temperature sensor 265 may be operatively coupled to the control system 160 to provide the measured temperatures to the control system 160. The control system 160 may utilize the measured temperatures to adjust parameters and/or operations of the fuel cell heater system 200, as will be described in further detail below.

Figure 3:
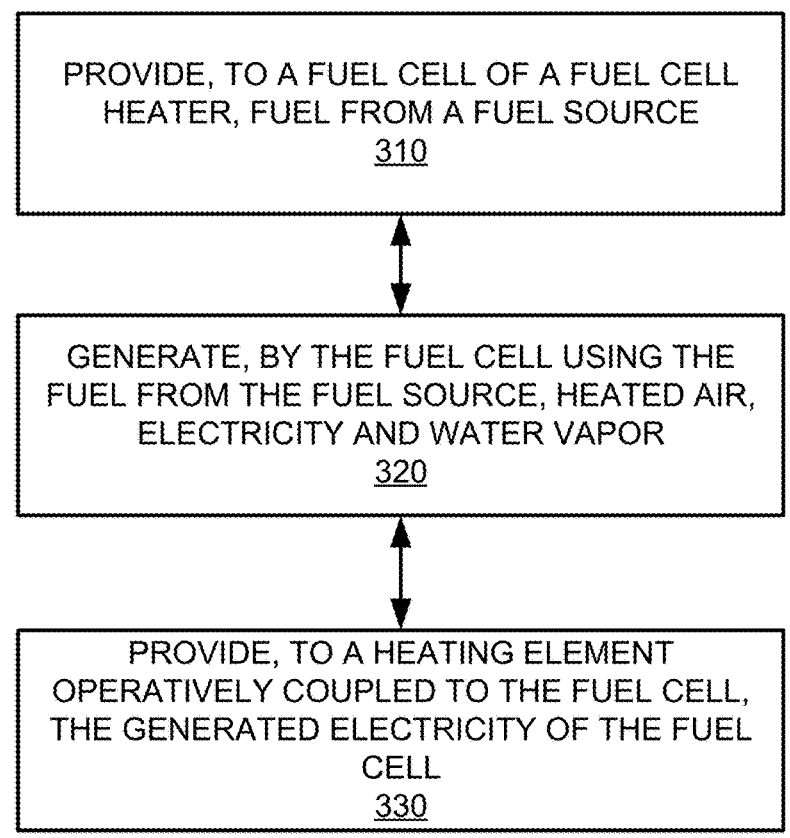
FIG. 3 depicts a flow diagram of a method for utilizing a fuel cell heater in accordance with one implementation of the present disclosure.

FIG. 3 depicts a flow diagram of a method 300 for utilizing a fuel cell heater in accordance with one implementation of the present disclosure. In embodiments, various portions of method 300 may be performed by fuel cell heater 100 and/or fuel cell heater system 200 of FIGS. 1 and 2, respectively.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

At block 310, a fuel source provides fuel to a fuel cell of a fuel cell heater. In embodiments, the fuel cell heater may be a flameless fuel cell heater. In some embodiments, prior to providing the fuel to the fuel cell, hydrogen may be extracted from the fuel stored at the fuel source by a reformer. In embodiments, the extracted hydrogen may be stored at a low pressure storage prior to providing the extracted hydrogen to the fuel cell.

At block 320, the fuel cell generates heated air, electricity and water vapor using the fuel from the fuel source, as previously described.

At block 330, the fuel cell provides the generated electricity to a heating element that is operatively coupled to the fuel cell. The heating element may convert the electricity generated by the fuel cell into thermal energy. In embodiments, the heated air generated by the fuel cell may be moved by a heat transfer system and combined with the thermal energy of the heating element. In an embodiment, the electricity generated by the fuel cell may be provided to components of the heat transfer system to power the components. In some embodiments, the electricity generated by the fuel cell may be provided to an AC/DC converter, which converts the electricity from direct current to alternating current to power ancillary devices. In embodiments, the water vapor generated by the fuel cell may be provided to a water storage system.

Figure 4:
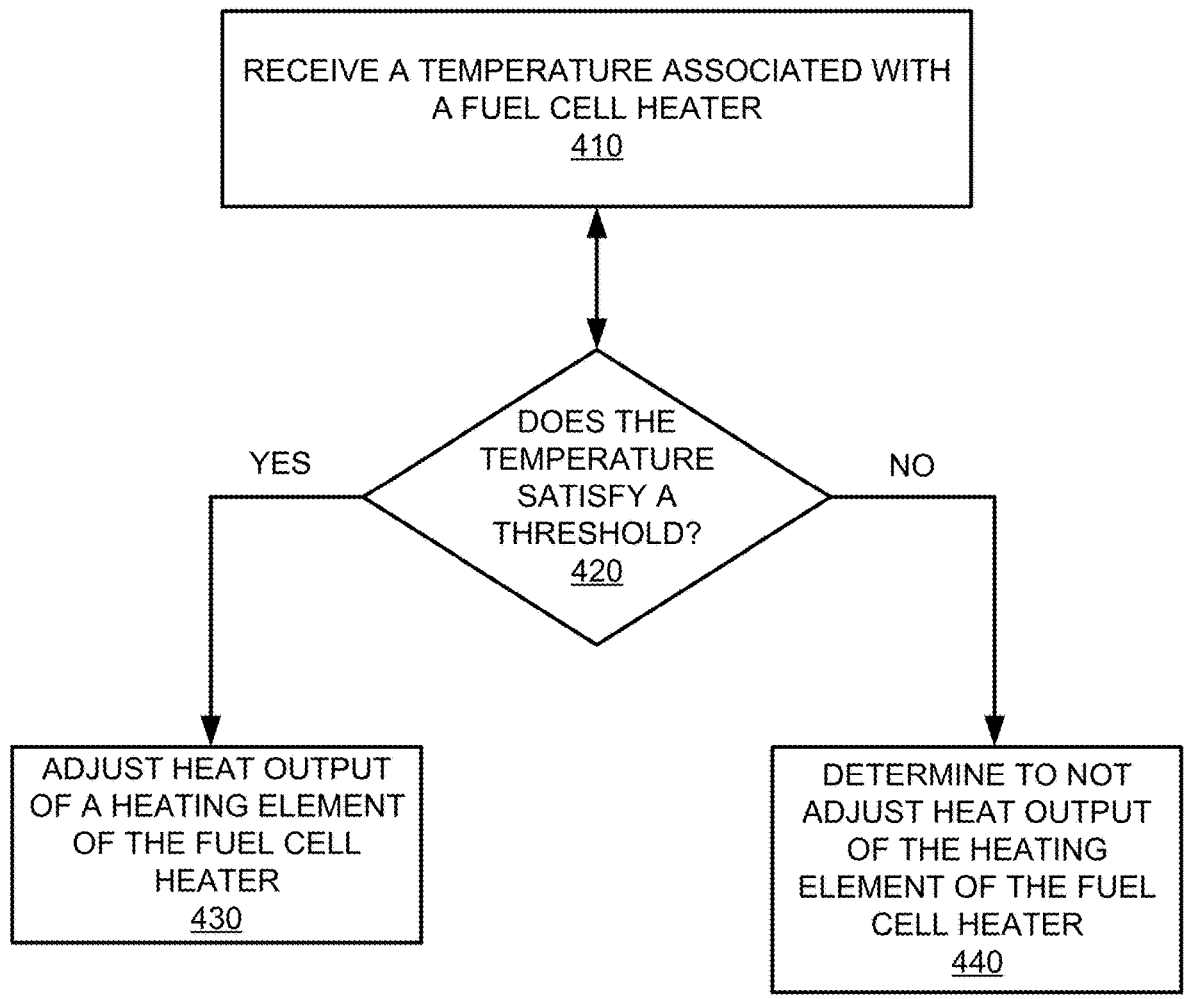
FIG. 4 depicts a flow diagram of a method for controlling a fuel cell heater system in accordance with implementations of the present disclosure.

FIG. 4 depicts a flow diagram of a method 400 for controlling a fuel cell heater system in accordance with implementations of the present disclosure. In embodiments, various portions of method 400 may be performed by control system 160 of FIGS. 1 and 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

At block 410, a control system (e.g., processing device 502) receives a temperature associated with a fuel cell heater. In embodiments, the control system may receive the temperature from one or more temperature sensors of a fuel cell heater system. In an embodiment, the temperature may correspond to a temperature of a volume of space that is being heated by the fuel cell heater system. For example, the temperature may correspond to the temperature of a room being heated by the fuel cell heater system.

At block 420, the control system determines if the temperature received at block 410 satisfies a threshold. The threshold may correspond to a temperature value. In embodiments, the temperature may satisfy the threshold if the temperature is greater than or equal to the threshold. For example, if the threshold is 72 degrees and the temperature received at block 410 is 75 degrees, then the temperature satisfies the threshold. In some embodiments, the temperature may satisfy the threshold if the temperature is less than or equal to the threshold. For example, if the threshold is 72 degrees and the temperature received at block 410 is 68 degrees, then the temperature satisfies the threshold. In an embodiment, multiple thresholds may be used to create a range of temperatures. For example, a first threshold may be used that specifies a temperature less than or equal to 65 degrees satisfies the first threshold and a second threshold may be used that specifies a temperature greater than or equal to 75 degrees satisfies the second threshold. Accordingly, if the received temperature is outside of the specified temperature range (e.g., is less than or equal to 65 degrees or greater than or equal to 75 degrees), then the temperature satisfies the threshold. In embodiments, the threshold may be provided via a user interface of the control system. In some embodiments, the threshold may be provided via a temperature regulating device, such as a thermostat.

If the temperature satisfies the threshold, at block 430 the control system adjusts the heat output of a heating element of the fuel cell heater. In embodiments, the control system may adjust the heat output of the heating element by adjusting the amount of fuel provided to the fuel cell, thereby adjusting the amount of electricity generated by the fuel cell that is provided to the heating element. Since the heating element converts the electricity provided by the fuel cell into heat, adjusting the amount of electricity produced by the fuel cell also adjusts the heat output of the heating element. For example, if the temperature received at block 410 is too high (e.g., is greater than the threshold at block 420), then the control system may decrease the amount of fuel provided to the fuel cell such that less electricity is generated by the fuel cell and provided to the heating element, reducing the heat output of the heating element. In another example, if the temperature received at block 420 is too low (e.g., is less than the threshold at block 420), then the control system may increase the amount of fuel provided to the fuel sell such that more electricity is generated by the fuel cell and provided to the heating element, increasing the heat output of the heating element.

In some embodiments, the control system may adjust the heat output of the heating element by adjusting the current of the electricity provided to the heating element from the fuel cell. For example, if the temperature received at block 410 is too high, then the control system may decrease the current of the electricity provided to the heating element, which decreases the heat output of the heating element. In another example, if the temperature received at block 410 is too low, then the control system may increase the current of the electricity provided to the heating element, which increases the heat output of the heating element. In embodiments, the control system may adjust the current of the electricity using a voltage regulator operatively coupled between the fuel cell and the heating element.

In some embodiments, the control system may determine to not adjust the amount of fuel and/or current of electricity above and/or below a specified value. For example, the control system may identify a maximum amount of fuel that may be provided to a fuel cell of a fuel cell heater and determine to not adjust the amount of fuel above the maximum amount. In another example, the control system may identify a maximum current that may be provided to a heating element and determine to not adjust the current of the electricity provided to the heating element to exceed the identified value.

If the control system determines the temperature does not satisfy the threshold, at block 440 the control system determines to not adjust the heat output of the heating element of the fuel cell heater.

Figure 5:
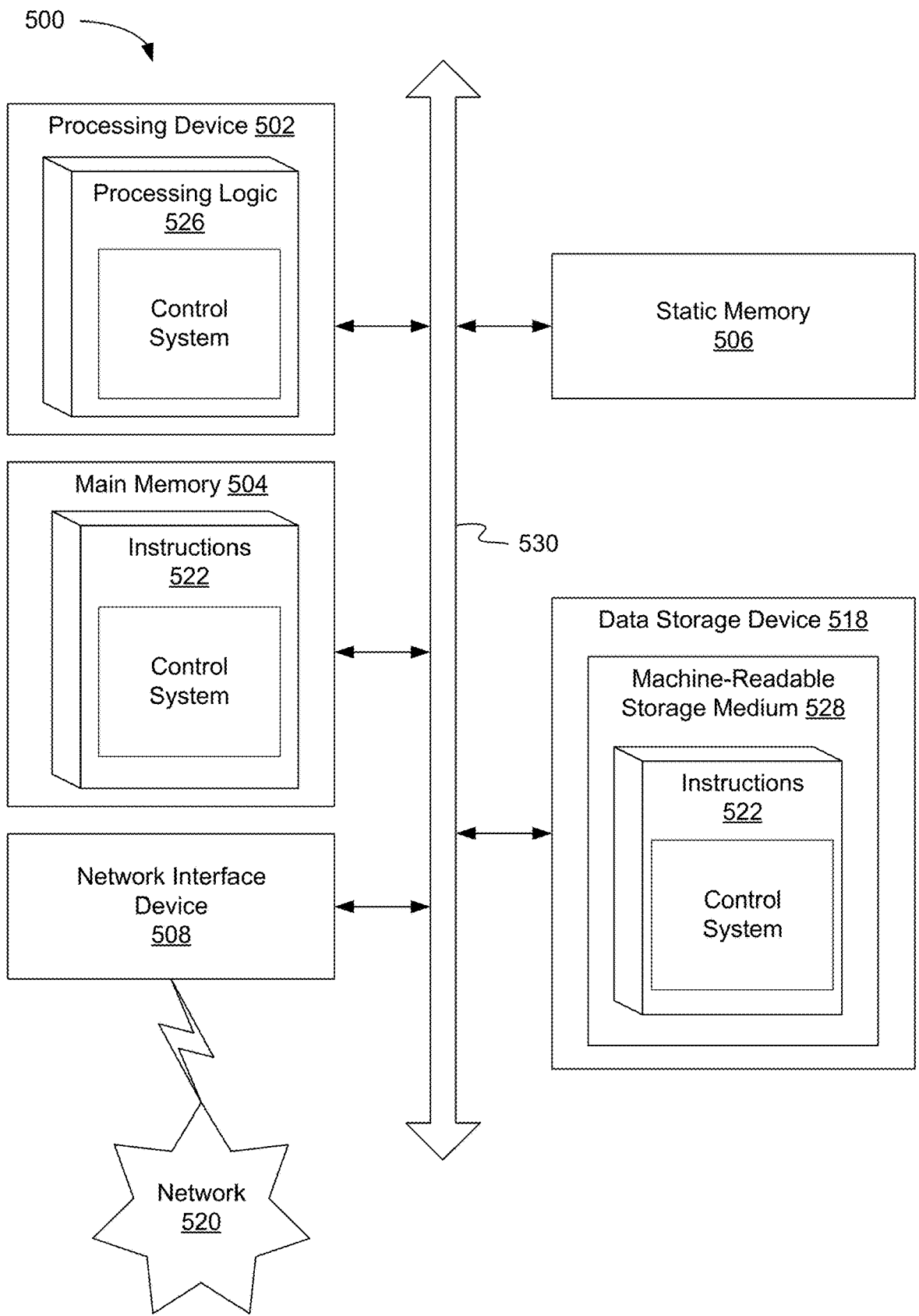
FIG. 5 is a block diagram illustrating an example computer system, in accordance with one embodiment of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server configured to control the operations of fuel cell heater 100 and/or fuel cell heater system 200.

The exemplary computer system 500 includes a processing device 502, a user interface display (not shown), a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of systems 100 and 200 shown in FIGS. 1 and 2, for performing the operations and blocks discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute a control system (e.g., control system 160). The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for device identification, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure.

It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A heater comprising:
   a fuel cell to produce heated air, electricity and water vapor;
   a heating element operatively coupled to the fuel cell to convert the electricity to heat and to provide the heat to one or more locations outside of the fuel cell;
   a fan system operatively coupled to the fuel cell, the fan system being configured to move the heated air produced by the fuel cell to the one or more locations outside of the fuel cell;
   a temperature sensor, the temperature sensor being configured to monitor a temperature of a volume of space being heated by the heater, wherein the volume of space is located outside of the fuel cell; and
   a control system operatively coupled to the fuel cell, the fan system, the temperature sensor, and the heating element, the control system comprising a processing device being programmed to monitor the fuel cell, the fan system, and the heating element, and in response to determining that the temperature of the volume of space being heated by the heater satisfies a first threshold and a second threshold, adjust heat output of the heating element of the fuel cell heater.

2. The heater of claim 1, wherein the fan system further being configured to:
   receive electricity from the fuel cell to power the fan system; and
   combine the heated air with heat generated by the heating element to the one or more locations outside the fuel cell.

3. The heater of claim 1, further comprising:
   a pump system operatively coupled to the fuel cell, the pump system being configured to move the heated air produced by the fuel cell to the one or more locations outside the fuel cell.

4. The heater of claim 1, further comprising:
   a fuel source operatively coupled to the fuel cell, the fuel source being configured to provide fuel to the fuel cell.

5. The heater of claim 4, wherein the fuel source comprises hydrocarbon fuel.

6. The heater of claim 5, further comprising:
   a reformer operatively coupled to the fuel source and the fuel cell, the reformer being configured to extract hydrogen from the hydrocarbon fuel and provide the extracted hydrogen to the fuel cell.

7. The heater of claim 1, further comprising:
   an alternating current to direct current (AC/DC) converter operatively coupled to the fuel cell, the AC/DC converter being configured to convert the electricity produced by the fuel cell from direct current to alternating current.

8. The heater of claim 7, wherein the AC/DC converter is operatively coupled to a heat transfer system to provide electricity to components of the heat transfer system.

9. The heater of claim 1, wherein the heater comprises a flameless heater.

10. The heater of claim 1, further comprising:
    a radiator operatively coupled to the fuel cell, the radiator being configured to transfer thermal energy of the heated air produced by the fuel cell.

11. The heater of claim 1, further comprising:
a water storage system operatively coupled to the fuel cell to store the water vapor produced by the fuel cell.

12. A method comprising:
providing, to a fuel cell of a fuel cell heater, fuel from a fuel source;
generating, by the fuel cell using the fuel from the fuel source, heated air, electricity and water vapor;
providing, to a heating element and a fan system operatively coupled to the fuel cell, the generated electricity of the fuel cell;
receiving, by a control system of the fuel cell heater, a temperature of a volume of space being heated by the fuel cell heater, wherein the volume of space is located outside of the fuel cell associated with the fuel cell heater;
determining, by the control system comprising a processing device being programmed to perform, whether the temperature associated with the volume of space being heated by the fuel cell heater satisfies a first threshold and a second threshold;
in response to determining that the temperature satisfies the first threshold and the second threshold, adjusting heat output of the heating element of the fuel cell heater; and
moving, by the fan system, the heated air produced by the fuel cell to one or more locations outside of the fuel cell.

13. The method of claim 12, wherein adjusting the heat output by the heating element of the fuel cell heater comprises at least one of:
adjusting an amount of the fuel provided to the fuel cell from the fuel source, or
adjusting a current of the generated electricity provided to the heating element from the fuel cell.

14. The method of claim 12, wherein the fuel cell heater system comprises a flameless fuel cell heater.

15. The method of claim 12, further comprising:
combining the heated air with heat generated by the heating element to the one or more locations outside the fuel cell.

16. The method of claim 12, wherein the fuel source comprises hydrocarbon fuel.

17. The method of claim 16, further comprising:
providing the hydrocarbon fuel source to a reformer of the fuel cell heater, the reformer being configured to extract hydrogen from the hydrocarbon fuel and provide the extracted hydrogen to the fuel cell.

18. The method of claim 12, further comprising:
providing the water vapor generated by the fuel cell to a water storage system.

* * * * *